(12) United States Patent
Yada et al.

(10) Patent No.: US 7,476,299 B2
(45) Date of Patent: Jan. 13, 2009

(54) VESSEL FOR EASILY POLYMERIZABLE COMPOUND

(75) Inventors: Shuhei Yada, Tokyo (JP); Yasushi Ogawa, Yokkaichi (JP); Yoshiro Suzuki, Yokkaichi (JP); Kenji Takasaki, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/399,470

(22) Filed: Apr. 7, 2006

(65) Prior Publication Data

US 2006/0249365 A1 Nov. 9, 2006

Related U.S. Application Data

(63) Continuation of application No. PCT/JP2004/012978, filed on Sep. 7, 2004.

(30) Foreign Application Priority Data

Nov. 17, 2003 (JP) .............................. 2003-386413

(51) Int. Cl.
*B01D 1/30* (2006.01)
*B01D 3/14* (2006.01)
*B01D 3/32* (2006.01)
*B01J 19/00* (2006.01)

(52) U.S. Cl. ........................... 203/8; 159/43.1; 159/901; 159/DIG. 2; 202/153; 202/158; 202/197; 202/262; 203/9; 203/29; 203/98; 203/DIG. 21; 203/DIG. 25; 422/129; 562/600

(58) Field of Classification Search ................ 159/43.1, 159/901, DIG. 2; 202/152, 153, 158, 197, 202/262; 203/8, 9, 29, 38, 40, 98, DIG. 25, 203/DIG. 21; 422/129; 562/545, 600
See application file for complete search history.

(56) References Cited

U.S. PATENT DOCUMENTS 2,071,643 A * 2/1937 Maker ...................... 196/100

(Continued)

FOREIGN PATENT DOCUMENTS

JP 8-24502 1/1996

(Continued)

OTHER PUBLICATIONS

Chernobylsky I.I., Khaitin B.C., "Polymerizing Apparatuses" Kiev, 1968, p. 8-9.

*Primary Examiner*—Virginia Manoharan
(74) *Attorney, Agent, or Firm*—Oblon, Spivak, McClelland, Maier & Neustadt, P.C.

(57) ABSTRACT

A decomposition reaction apparatus or distillation apparatus for acrylic acid in which a column bottom liquid heated in a reboiler (5) is supplied from a supply port (1*a*) provided on a side wall of a column body (1) having: a top plate (12*a*) above the supply port (1*a*); and an impingement plate (12*b*) provided vertically to the top plate (12*a*), for preventing scattering of the column bottom liquid to a supply direction. The top plate (12*a*) is provided such that the top face of the top plate (12*a*) is inclined downward from a base end to a tip end. The present invention allows: suppression of formation of a polymerized product due to flowing of a liquid or gas heated in a reboiler into a column with a simple structure; and a stable continuous operation of column equipment over a long period of time.

7 Claims, 6 Drawing Sheets

U.S. PATENT DOCUMENTS

| | | | |
|---|---|---|---|
| 2,398,213 A * | 4/1946 | Dutson, Jr. et al. | 208/358 |
| 4,490,215 A * | 12/1984 | Bannon | 203/98 |
| 4,917,770 A * | 4/1990 | Asbury et al. | 202/176 |
| 5,336,376 A * | 8/1994 | Taurat et al. | 202/182 |
| 5,972,171 A | 10/1999 | Ross et al. | |
| 6,348,135 B1 * | 2/2002 | Nakahara et al. | 203/8 |
| 6,382,313 B2 * | 5/2002 | Mitsumoto et al. | 165/159 |
| 6,409,886 B1 | 6/2002 | Matsumoto et al. | |
| 6,641,700 B1 | 11/2003 | Matsumoto et al. | |
| 2005/0040023 A1 * | 2/2005 | Hino et al. | 202/82 |

FOREIGN PATENT DOCUMENTS

| | | |
|---|---|---|
| JP | 9-255650 | 9/1997 |
| JP | 2000-254403 | 9/2000 |
| JP | 2000-355570 | 12/2000 |

\* cited by examiner

VESSEL FOR EASILY POLYMERIZABLE COMPOUND

TECHNICAL FIELD

The present invention relates to column equipment such as a distillation column and an evaporation column for an easily polymerizable compound or a decomposition reaction column for a high boiling point substance, and peripheral equipment of the same. The present invention more specifically relates to column equipment having a reboiler and peripheral equipment of the same.

BACKGROUND ART

Production equipment of an easily polymerizable compound such as (meth)acrylic acid or (meth)acrylate employs column equipment such as a distillation column for crude (meth)acrylic acid or crude (meth)acrylate or a decomposition reaction column for recovering (meth)acrylic acid or the like by decomposing a high boiling point substance. In such column equipment, part of a column bottom liquid introduced into a reboiler and heated therein may be returned to the column. In order to return a liquid containing an easily polymerizable compound to the column from the reboiler, the column may be provided with: a nozzle for supplying the heated liquid to the column from an opening part on a side wall of the column; an impingement plate for preventing scattering of the liquid to a supply direction; and a top plate for preventing upward scattering of the liquid.

In column equipment having such a structure, a liquid containing an easily polymerizable compound accumulates on a top face of the top plate owing to: supply from the side wall of the column; adhesion or dropping of droplets from above the top plate; and the like. The accumulated liquid is heated by a liquid or gas heated in a reboiler and may form a polymerized product.

As a countermeasure to formation of the polymerized product, a method involving providing at least one hole on a top plate for preventing accumulation of the liquid and allowing the liquid on the top plate to fall may be employed. However, a liquid or gas heated in a reboiler passes through this hole, and thus-caused resistance prevents sufficient falling of the liquid on the top plate. Provision of many holes for the purpose of sufficient falling of the liquid allows the liquid or gas heated in a reboiler to pass through the holes. Thus, the purpose for providing the top plate (to suppress upward flow of the liquid or gas heated in a reboiler with the top plate) cannot be sufficiently attained.

DISCLOSURE OF THE INVENTION

An object of the present invention is to allow: suppression of formation of a polymerized product due to flowing of a liquid or gas heated in a reboiler into a column with a simple structure; and a stable continuous operation of column equipment over a long period of time by solving the above problems.

The inventors of the present invention have studied intensively and have found out that the above object can be attained by providing a top plate for preventing upward scattering of a liquid containing an easily polymerizable compound supplied from a reboiler such that a tip end of the top plate is inclined downward, in column equipment for treating the easily polymerizable compound.

That is, the present invention is a vessel for an easily polymerizable compound, comprising: a receiving part, which has a side wall and a supply port opened to the side wall for supplying the liquid, for receiving the liquid supplied from the supply port; a top plate, which is provided so as to extend from the side wall above the supply port, for preventing upward scattering of the liquid from the supply port; and an impingement plate, which is provided away from the supply port, for preventing scattering of the liquid from the supply port to a supply direction, wherein a top face of the top plate is inclined downward from a base end to a tip end of the top plate, when a side wall end of the top plate is defined as the base end and an extended end of the top plate is defined as the tip end.

According to the present invention described above, inclination of the top plate prevents formation of a polymerized product because a liquid accumulated on the top plate is eliminated.

BEST MODE FOR CARRYING OUT THE INVENTION

Figure 1:
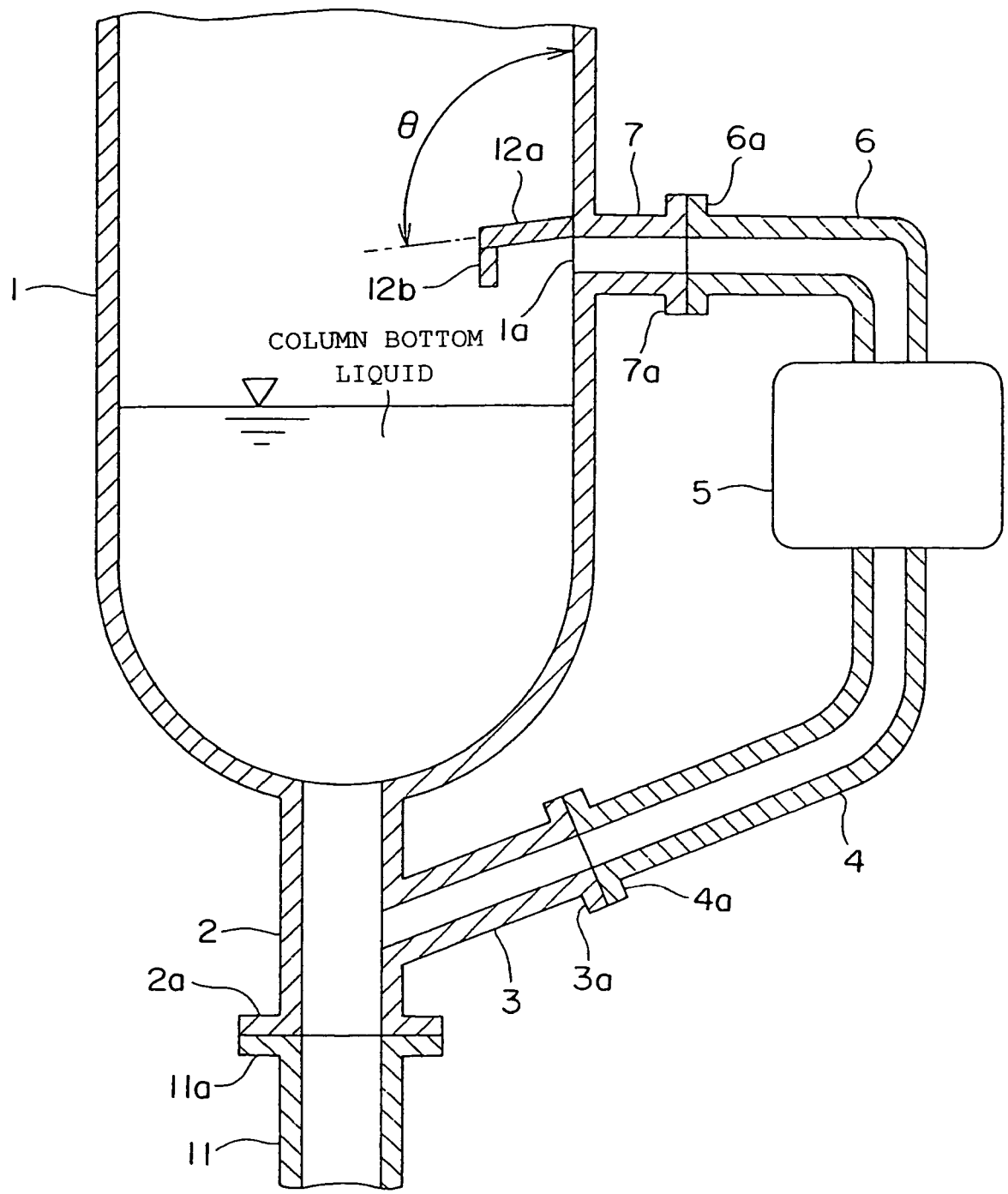
FIG. 1 is a vertical sectional view of a lower part of a column body 1 such as a distillation column or a decomposition reaction column according to an embodiment of the present invention.

A vessel for an easily polymerizable compound of the present invention comprises: a receiving part, which has a side wall and a supply port opened to the side wall for supplying the liquid, for receiving the liquid supplied from the supply port; a top plate, which is provided so as to extend from the side wall above the supply port, for preventing upward scattering of the liquid from the supply port; and an impingement plate, which is provided away from the supply port, for preventing scattering of the liquid from the supply port to a supply direction. The vessel for an easily polymerizable compound of the present invention can be applied to a vessel receiving at least the liquid.

The easily polymerizable compound which is a subject of the present invention is not particularly limited so long as the compound easily polymerizes by virtue of heat or the like. Of the easily polymerizable compounds, at least one selected from the group consisting of acrylic acid, methacrylic acid, and esters thereof is preferred. Examples of acrylates include methyl acrylate, ethyl acrylate, butyl acrylate, isobutyl acrylate, t-butyl acrylate, 2-ethylhexyl acrylate, 2-hydroxyethyl acrylate, 2-hydroxypropyl acrylate, and methoxyethyl acrylate. Examples of methacrylates include similar compounds to the above acrylates.

The receiving part is not particularly limited so long as the receiving part includes a side wall and a supply port for supplying the liquid and receives the liquid supplied from the supply port. Examples of the receiving part include a distillation column, an evaporation column, a decomposition reaction column for a high boiling point substance or the like, and a tank for receiving a liquid easily polymerizable compound. In the present invention, the receiving part is preferably one selected from the group consisting of a distillation column, an evaporation column, and a decomposition reaction column for a high boiling point substance or the like.

The liquid containing an easily polymerizable compound is not particularly limited so long as the liquid contains an easily polymerizable compound. Examples of the liquid include: a liquid containing a liquid easily polymerizable compound; and a solution of the easily polymerizable compound containing an appropriate solvent and an easily polymerizable compound. The liquid may contain an additive such as a polymerization inhibitor added as required.

The top plate is provided so as to extend from the side wall above the supply port in the receiving part. As the top plate, a top plate; which prevents upward scattering of the liquid from the supply port and has a top face inclined downward from a base end to a tip end of the top plate, when a side wall end of the top plate is defined as the base end and an extended end of the top plate is defined as the tip end; is used. Such a top plate may employ: a plate having a shape with parallel top and bottom faces; or a member shaped into a wedge-like shape with the top face or the top face and the bottom face in which a distance between the top face and a bottom face of a section gradually decreases from one end to the other.

Further, the top plate may have a top face inclined downward from a central part to at least one side end of the top plate. Examples of such a top plate include: a semi-cylindrical top plate provided such that a cross sectional shape of the top plate across an extension direction is an arc which is convex upward; and a flat plate provided to be inclined downward from one side end to the other side end of the top plate. Such a top plate may be inclined downward from a base end to a tip end, or need not be inclined downward from a base end to a tip end.

The shape and number of the top plate used in the present invention are not particularly limited so long as the above-mentioned conditions are satisfied. Further, the top plate can be provided with holes, grooves, or the like for immediately eliminating the easily polymerizable compound on the top face of the top plate without limitation to the number or shape.

An angle of 91 to 135° between a top face of the top plate and the side wall is preferably in terms of preventing upward scattering of the liquid from the supply port and preventing accumulation of the liquid on the top face of the top plate and so on. An angle of inclination of the top plate of less than 91° may not sufficiently prevent the accumulation of the liquid on the top face of the top plate, possibly resulting in formation of a polymerized product of the easily polymerizable compound. An angle of inclination of the top plate exceeding 135° may not sufficiently prevent upward scattering of the liquid or may adversely affect a supply of the liquid to the receiving part.

The shape and number of the impingement plate are not particularly limited so long as the impingement plate is provided away from the supply port in the receiving part, and prevents scattering of the liquid from the supply port in a supply direction. The impingement plate may be provided vertically from the top plate or may be supported by a supporting member extending from the side wall.

The vessel for an easily polymerizable compound of the present invention preferably comprises: a liquid circulation passage for drawing the liquid received in the receiving part and returning the liquid to the receiving part from the supply port; and a reboiler for heating the liquid in the liquid circulation passage, for applying the present invention to the above-mentioned distillation column, evaporation column, and decomposition reaction column for a high boiling point substance.

The high boiling point substance in the present invention refers to a composition containing an easily polymerizable compound and a composition having a boiling point higher than that of the easily polymerizable compound. Examples of such a high boiling point substance include a Michael adduct described below, a column bottom liquid, and a residue.

The liquid circulation passage may be: a passage for the liquid opening to a bottom portion of the receiving part and connecting the bottom opening part to the supply port; or a passage connecting a draw line for discharging the liquid from the receiving part to the supply port, for returning part of the liquid in the draw line to the receiving part from the supply port.

The reboiler is not particularly limited so long as the reboiler is a device for heating the liquid introduced into the liquid circulation passage to a desired temperature. The reboiler may employ a known device such as: a heat exchanger such as a vertical fixed tube plate type heat exchanger in which the liquid flows through tubes and a heating medium flows through a shell; and a heater for heating the liquid in the liquid circulation passage. Specific examples of the heat exchanger include a vertical fixed tube plate type, a horizontal fixed tube plate type, a U-tube type, a double-pipe type, a spiral type, a square block type, a plate type, and a film evaporator type. The reboiler is usually attached to each column. The reboiler is generally classified into a reboiler provided inside a column (receiving part) and a reboiler provided outside the column, but is usually provided outside the column in the present invention.

Other member or device may be further used in the present invention. Examples of such other member or device include: a bottom plate provided below the supply port for preventing downward scattering of the liquid from the supply port or for reducing a downward flow rate of the liquid from the supply port; a side plate provided on a side of the supply port for preventing horizontal scattering of the liquid from the supply port; a liquid delivery device such as a pump provided in the liquid circulation passage; and flow rate detection device such as a current meter or a flowmeter. Such other member or device can be arbitrarily provided according to conditions such as a form of the receiving part, the structure of the vessel for an easily polymerizable compound of the present invention, a kind of the easily polymerizable compound, and a composition of the liquid.

If the receiving part is a distillation column, for example, a distillation column generally used in a chemical plant may be employed. Trays or packing is provided inside the distillation column. Specific examples of the trays include bubble cap trays each having a downcorner, perforated-plate trays, valve trays, SUPERFRAC trays, MAX-FRAC trays, and dual flow trays without downcorners.

Examples of structured packing include: SULZER PACKING available from Sulzer Brothers Ltd.; SUMITOMO-SULZER PACKING available from Sumitomo Heavy Industries, Ltd.; MELLAPAK available from Sumitomo Heavy Industries, Ltd.; GEM-PAK available from Koch-Glitsch, LP; MONTZ-PAK available from Julius Montz GmbH; GOOD ROLL PACKING available from Tokyo Tokushu Kanaami K. K.; HONEYCOMB PACK available from NGK Insulators, Ltd.; IMPULSE PACKING available from Nagaoka International Corporation; and MC PACK available from Mitsubishi Chemical Engineering Corporation. Examples of random packing include: INTALOX SADDLES available from Saint-Gobain NorPro; TELLERETT available from Nittetsu Chemical Engineering Ltd.; PALL RINGS available from BASF Aktiengesellschaft; CASCADE MINI-RING available Mass Transfer Ltd.; and FLEXI RINGS available from JGC Corporation.

The type of the tray and packing is not limited in the present invention, and one type each of the tray and packing can be used, or two or more thereof may be used in combination, as generally used.

If the receiving part is an evaporation column, an evaporation column generally used in a chemical plant may be employed. That is, the evaporation column is provided with an evaporator and a reboiler and may optionally comprise a cooling heat exchanger for condensing a gas which was evaporated, a tank for storing a condensate, and a pump for delivering the condensate and so on. The structure of the evaporation column is not particularly limited in the present invention. The decomposition reaction column has a same structure as that of the evaporation column. There may be a case in which the tray or the packing is provided and a case in which the tray or the packing is not provided in the column. In the present invention, either case may be applied.

Materials for various nozzles, a column body, a reboiler, a tube, a top plate, an impingement plate, and the like in each column used in the present invention are selected depending on the easily polymerizable compound used and temperature conditions thereof. Stainless steels are often used as such materials in handling such as production, purification, or the like (hereinafter, may also be simply referred to as "production") of (meth)acrylic acid and (meth)acrylates, which are typical easily polymerizable substances, for example, but the materials are not limited to stainless steels. Examples of such materials include SUS 304, SUS 304L, SUS 316, SUS 316L, SUS 317, SUS 317L, SUS 327, and hastelloys. The materials are selected corresponding to physical properties of each liquid from a viewpoint of corrosion resistance.

The vessel for an easily polymerizable compound of the present invention may be used in part of step or all steps in production of the easily polymerizable compound. The steps for producing a purified product of acrylic acid, which is an easily polymerizable compound, includes the following steps (1) to (3), for example.

(1) A method includes: an oxidation step for producing acrylic acid through vapor phase catalytic oxidation of propane, propylene, and/or acrolein; a collection step for collecting acrylic acid as an aqueous solution of acrylic acid by bringing a gas containing acrylic acid produced in the oxidation step into contact with water; an extraction step for extracting acrylic acid by using an appropriate extracting solvent from the aqueous solution of acrylic acid obtained in the collection step; a separation step for separating the acrylic acid and the solvent from the obtained extract; a purification step for purifying the separated acrylic acid through distillation or the like; a recovery step for recovering valuable substances by supplying to a decomposition reaction column as a raw material, a high boiling point liquid (liquid high boiling point substance) containing Michael adducts of acrylic acid recovered from the above-mentioned steps and a polymerization inhibitor used in each of the steps; and a recycle step for supplying the recovered valuable substances to any step after the collection step.

(2) A method includes: an oxidation step for producing acrylic acid through vapor phase catalytic oxidation of propane, propylene, and/or acrolein; a collection step for collecting acrylic acid as an aqueous solution of acrylic acid by bringing a gas containing acrylic acid produced in the oxidation step into contact with water; an azeotropic separation step for taking out crude acrylic acid from a column bottom of an azeotropic separation column by distilling the aqueous solution of acrylic acid obtained in the collection step in the azeotropic separation column in the presence of an azeotropic solvent; an acetic acid separation step for removing acetic acid from the acrylic acid taken out; a purification step for removing high boiling point impurities; a recovery step for recovering valuable substances by supplying to a decomposition reaction column as a raw material, a high boiling point liquid containing Michael adducts of acrylic acid recovered from the above-mentioned steps and a polymerization inhibitor used in each of the steps; and a recycle step for supplying the valuable substances to any step after the collection step.

(3) A method includes: an oxidation step for producing acrylic acid through vapor phase catalytic oxidation of propane, propylene, and/or acrolein; a collecting/separation step for collecting acrylic acid as an organic solution of acrylic acid by bringing a gas containing acrylic acid formed in the oxidation step into contact with an organic solvent and simultaneously removing water, acetic acid, and the like; a separation step for taking out the acrylic acid from the organic solution of acrylic acid; a recovery step for recovering valuable substances by supplying to a decomposition reaction column as a raw material, a high boiling point liquid containing a polymerization inhibitor and an organic solvent used in each of the steps and Michael adducts of acrylic acid recovered from the above-mentioned steps; a recycle step for supplying the valuable substances to any step after the collection step; and a solvent purification step for purifying a part or whole of the recovered organic solvent.

A method of producing acrylate includes, for example: an esterification reaction step involving a reaction of acrylic acid and an alcohol with an organic acid, cationic ion exchange resin, or the like as a catalyst; a concentration step involving extraction, evaporation, and distillation as unit operations for concentrating a liquid of crude acrylate obtained through the esterification reaction; a purification step for purifying in a purification column, the acrylate in the concentrated liquid obtained in the concentration step; and a recovery step for recovering valuable substances by supplying to a decomposition reaction column or returning to the process, a high boiling point liquid containing acrylates in a column bottom liquid of the purification column and Michael adducts such as β-acryloxypropionates, β-alkoxypropionates, and β-hydroxypropionates as main components, and polymerization inhibitors used in the above-mentioned steps. The unit operations in the concentration step are arbitrarily selected depending on a raw material ratio of the acrylic acid and the alcohol in the esterification reaction, the catalyst used in the esterification reaction, the physical properties of the raw material, by-products of the reaction, and the acrylates, or the like.

A high boiling point liquid may contain: acrylic acid, an acrylic acid dimer (hereinafter, referred to as a dimer), an acrylic acid trimer (hereinafter, referred to as a trimer), β-alkoxypropionic acids, and β-alkoxypropionates obtained from the section except the column bottom of the purification column of acrylate products in any step of the steps, as main components; and polymerization inhibitors used in the production steps, depending on the alcohol used. Valuable substances can be recovered from such a high boiling point liquid by supplying the high boiling point liquid as the high boiling point liquid containing Michael adducts to the decomposition reaction column. Then, the recovered valuable substances can be supplied to appropriate steps such as the esterification reaction step and the concentration step.

The above-mentioned Michael adduct of acrylic acid or acrylate refers to a product obtained through Michael condensation of acrylic acid and raw materials of acrylate. Examples of such a Michael adduct obtained in production of acrylic acid include: an acrylic acid dimer (hereinafter, referred to as a dimer); an acrylic acid trimer (hereinafter, referred to as a trimer); and an acrylic acid tetramer (hereinafter, referred to as a tetramer). Further, examples of a Michael adduct obtained in production of acrylate include: Michael adducts of acrylic acid to the above-mentioned acrylate such as an alkyl ester having 2 to 8 carbon atoms or a cycloalkyl ester such as β-acryloxypropionate; Michael adducts of an alcohol such as β-alkoxypropionate; dimers; trimers; tetramers; esters of trimers; esters of tetramers; β-hydroxypropionic acid; and β-hydroxypropionates.

Further, a polymerization inhibitor is used for suppressing formation of a polymerized product during the production in the production of an easily polymerizable compound such as acrylic acid or acrylate as described above.

Specific examples of the polymerization inhibitor used in present invention include copper acrylate, copper dithiocarbamate, a phenol compound, and a phenothiazine compound. Examples of the copper dithiocarbamate include: copper dialkyldithiocarbamates such as copper dimethyldithiocarbamate, copper diethyldithiocarbamate, copper dipropyldithiocarbamate, and copper dibutyldithiocarbamate; copper cycloalkylene dithiocarbamates such as copper ethylene dithiocarbamate, copper tetramethylene dithiocarbamate, copper pentamethylene dithiocarbamate, and copper hexamethylene dithiocarbamate; and copper cycloxydialkylene dithiocarbamates such as copper oxydiethylene dithiocarbamate. Examples of the phenol compound include hydroquinone, methoquinone, pyrogallol, catechol, resorcin, phenol, and cresol. Examples of the phenothiazine compound include phenothiazine, bis-(a-methylbenzyl)phenothiazine, 3,7-dioctylphenothiazine, and bis-(a-dimethylbenzyl)phenothiazine.

Other substances may be included in the present invention depending on the process, but the kinds thereof may be selected arbitrarily without marring the effect of the present invention.

Figure 3:
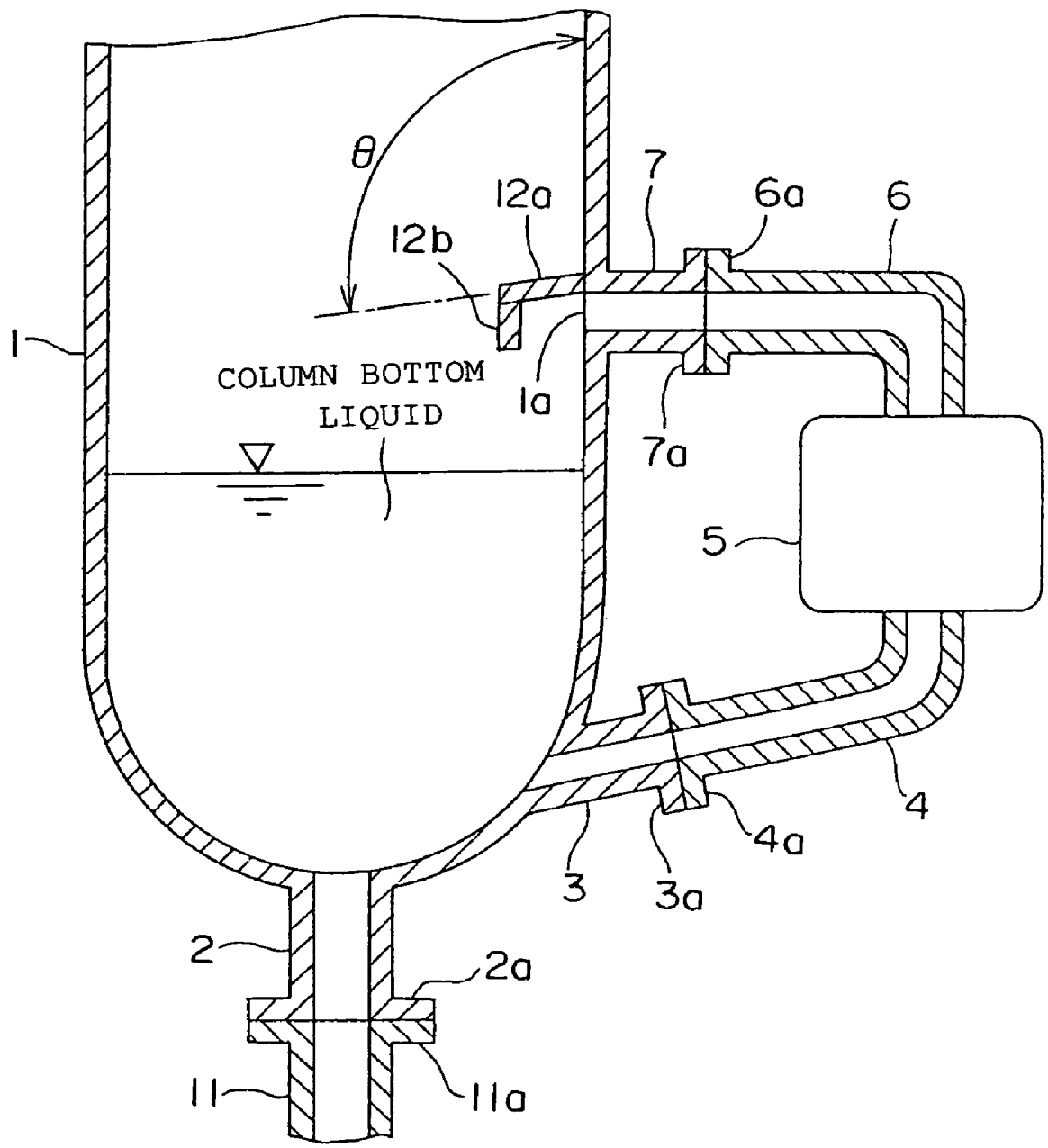
FIG. 3 is a vertical sectional view of a lower part of a column body 1 according to another embodiment of the present invention.
Figure 4:
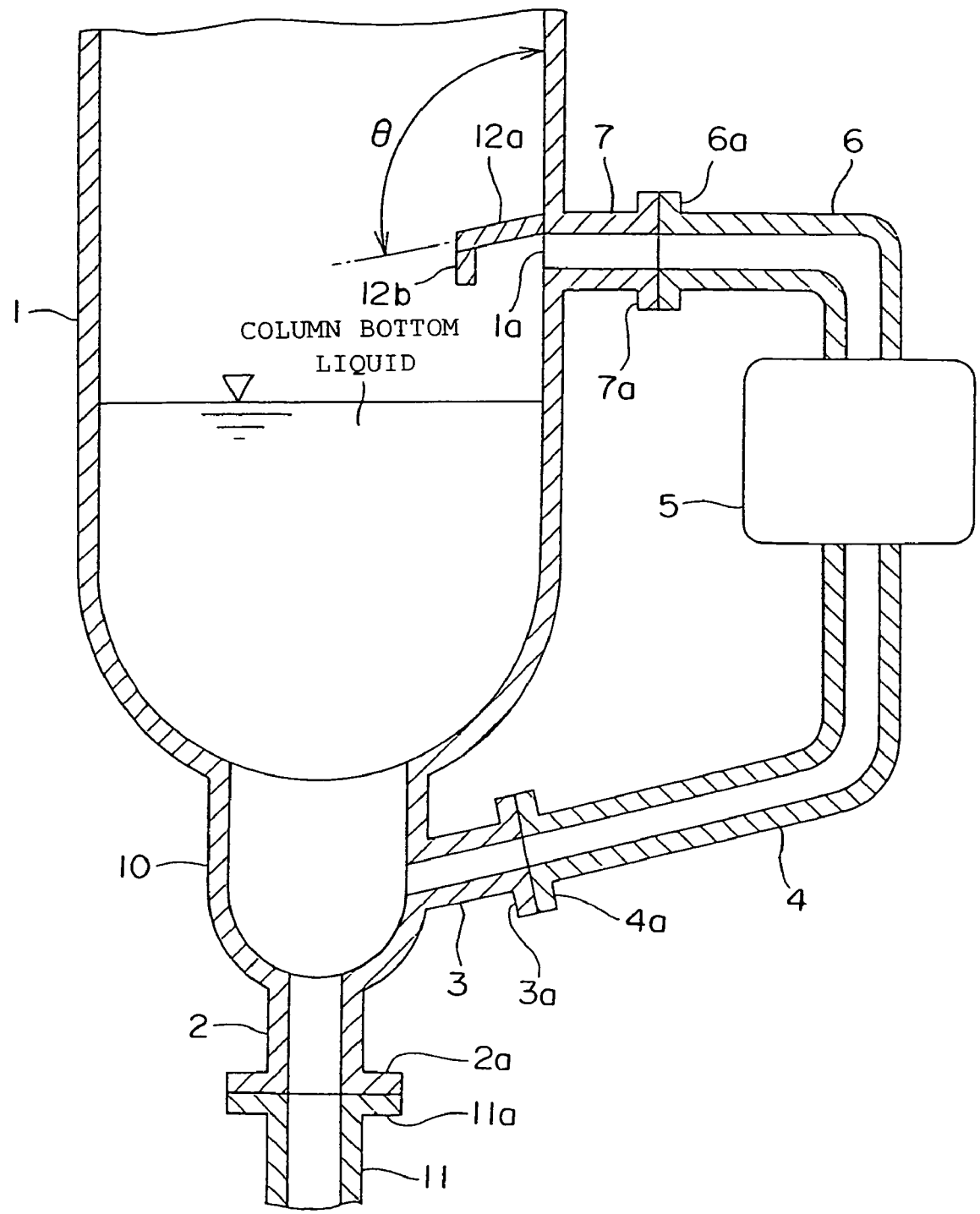
FIG. 4 is a vertical sectional view of a lower part of a column body 1 according to still another embodiment of the present invention.
Figure 5:
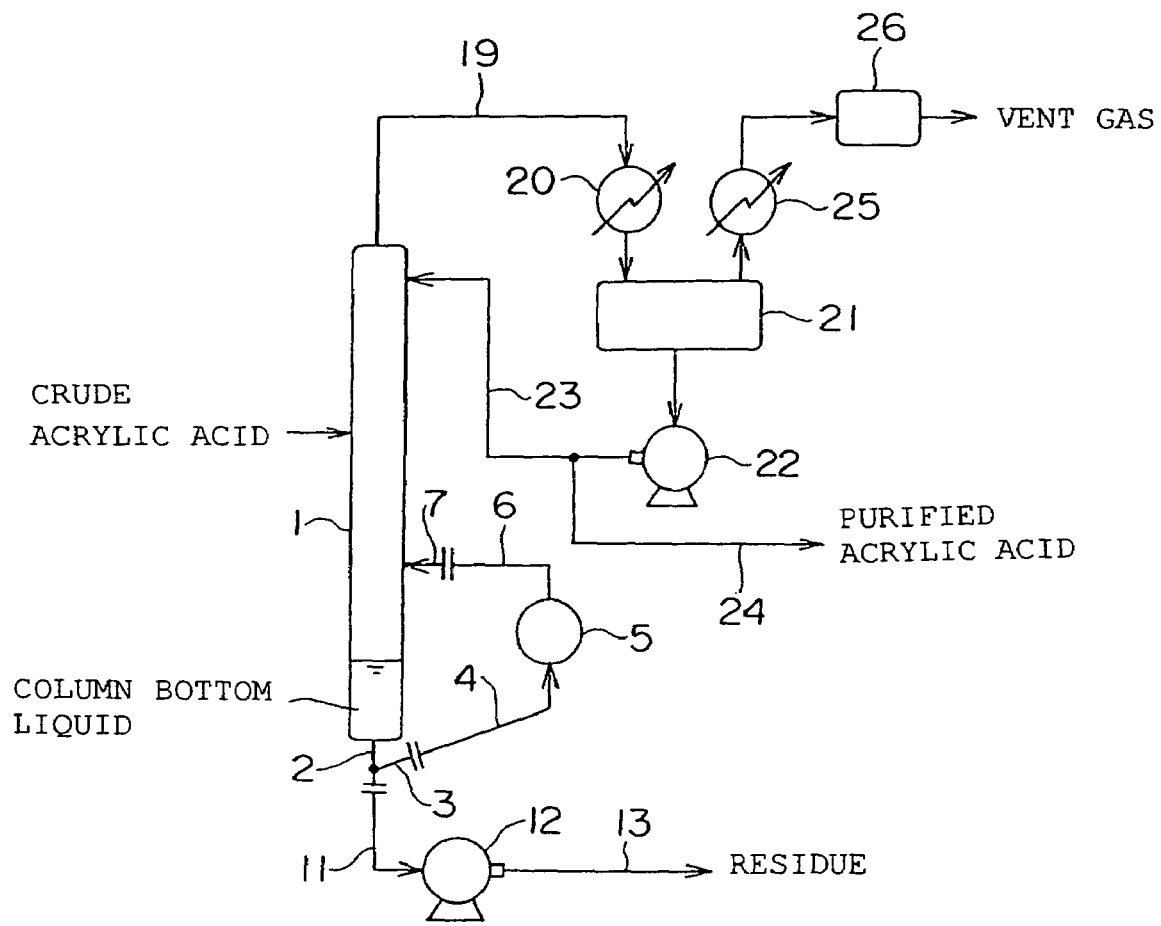
FIG. 5 is a schematic diagram of a distillation apparatus according to an embodiment of the present invention.
Figure 6:
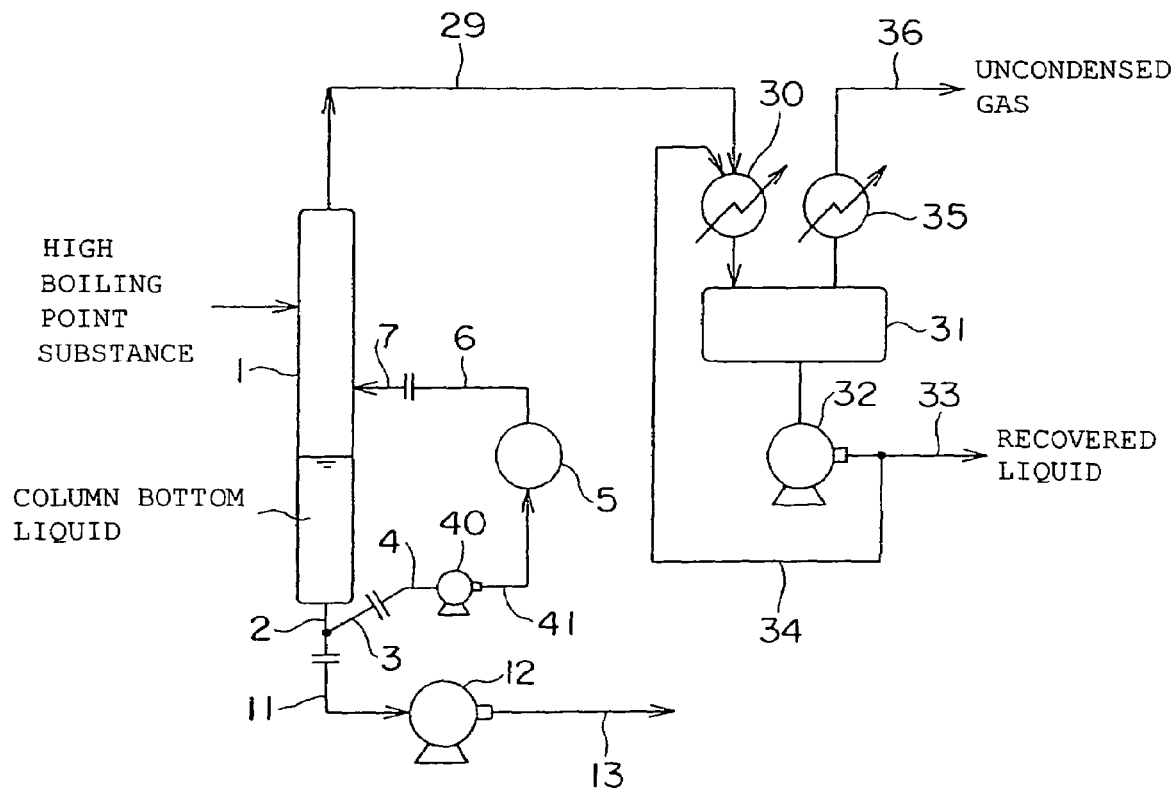
FIG. 6 is a schematic diagram of a decomposition reaction apparatus for a high boiling point substance according to an embodiment of the present invention.

The present invention will be described in more detail. Hereinafter, embodiments of the present invention will be described with reference to the drawings. FIGS. 1, 3, and 4 are each a vertical sectional view of a lower part of a column of column equipment for an easily polymerizable compound according to an embodiment of the present invention. FIGS. 5 and 6 are schematic diagrams of a distillation apparatus and a decomposition reaction apparatus each employing the column equipment. First, structures of the distillation apparatus and the decomposition reaction apparatus will be described.

The distillation apparatus is a distillation apparatus for acrylic acid. As shown in FIG. 5, the distillation apparatus is provided with: a column body 1 as a distillation column; a condenser 20 for cooling a vapor of acrylic acid distilled from the column body 1; a reflux tank 21 for receiving the acrylic acid condensed in the condenser 20; a vent gas condenser 25 for further cooling a gas component in the reflux tank 21; vacuum equipment 26 for bringing a distillation atmosphere under reduced pressure; a draw line for drawing a column bottom liquid of the column body 1; a circulation passage for returning part of the column bottom liquid drawn by the draw line to the column body 1; and a reboiler 5 for heating the column bottom liquid in the circulation passage.

A pump 22 is connected to the reflux tank 21, and a tube 23 connected to a column top part of the column body 1 is connected to the pump 22. A tube 24 branches from the tube 23.

The draw line comprises: a draw nozzle 2 connected to a column bottom part of the column body 1; a tube 11 connected to the draw nozzle 2; a pump 12 connected to the tube 11; and a tube 13 connected to the pump 12.

The circulation passage comprises: an introduction nozzle 3 connected to the draw line 2 and through which at least part of the column bottom liquid drawn by the draw nozzle 2 is introduced; a tube 4 connected to the introduction nozzle 3; the reboiler 5 connected to the tube 4; a tube 6 connected to the reboiler 5; and a nozzle 7 connecting the tube 6 and an opening part opened to a side wall of the column body 1 for supplying the column bottom liquid from the tube 6 to the column body 1.

In the distillation apparatus shown in FIG. 5, crude acrylic acid is introduced into the column body 1 for distillation, and part of the column bottom liquid circulates in an order of the draw nozzle 2, the introduction nozzle 3, the tube 4, the reboiler 5, the tube 6, and the nozzle 7. The column bottom liquid is also taken out as a residue through the draw nozzle 2, the tube 11, the pump 12, and the tube 13.

A fraction from the column top is introduced into the reflux tank 21 through the tube 19 and the condenser 20 for condensation. Part of the acrylic acid in the reflux tank 21 is returned to the column top through the pump 22 and the tube 23. The remaining acrylic acid is taken out as purified acrylic acid through the tube 24 which branches from the tube 23. A gas in the reflux tank 21 is cooled again in the vent gas condenser 25, and the condensed acrylic acid is returned to the reflux tank 21. A gas component is taken out as a vent gas after passing through the vacuum equipment 26.

In the distillation apparatus for acrylic acid shown in FIG. 5, a column bottom temperature is preferably 60 to 120° C., particularly preferably 70 to 100° C. A pressure is preferably 1 to 50 kPa, particularly preferably 2 to 20 kPa.

Further, the decomposition reaction apparatus is a decomposition reaction apparatus for a high boiling point substance formed in the process for producing acrylic acid or acrylate. As shown in FIG. 6, the decomposition reaction apparatus is provided with: a column body 1 as a decomposition reaction column for a high boiling point substance; a column top gas cooling heat exchanger 30 for cooling a vapor of acrylic acid or acrylate distilled from the column body 1; a liquid tank 31 for receiving the acrylic acid or acrylate condensed in the column top gas cooling heat exchanger 30; a vent gas cooling heat exchanger 35 for further cooling a gas component in the liquid tank 31; a draw line for drawing a column bottom liquid of the column body 1; a circulation passage for returning part of the column bottom liquid drawn by the draw line to the column body 1; and a reboiler 5 for heating the column bottom liquid in the circulation passage.

A pump 32 is connected to the liquid tank 31, and a tube 33 is connected to the pump 32. A tube 34 connected to the column top gas cooling heat exchanger 30 branches from the tube 33.

The draw line comprises: a draw nozzle 2 connected to a bottom part of the column body 1; a tube 11 connected to the draw nozzle 2; a pump 12 connected to the tube 11; and a tube 13 connected to the pump 12.

The circulation passage comprises: an introduction nozzle 3 connected to the draw line 2 and through which at least part of the column bottom liquid drawn by the draw nozzle 2 is introduced; a tube 4 connected to the introduction nozzle 3; a pump 40 connected to the tube 4; a tube 41 connected to the pump 40; the reboiler 5 connected to the tube 41; a tube 6 connected to the reboiler 5; and a nozzle 7 connecting the tube 6 and an opening part opened to a side wall of the column body 1, for supplying the column bottom liquid from the tube 6 to the column body 1.

The high boiling point substance is introduced into the column body 1 and is subjected to a decomposition reaction. Part of the column bottom liquid is returned to the column body 1 through the draw nozzle 2, the introduction nozzle 3, the tube 4, the pump 40, the reboiler 5, the tube 6, and the nozzle 7. The column bottom liquid is also taken out through the draw nozzle 2, the tube 11, the pump 12, and the tube 13.

A gaseous decomposition product is introduced into the liquid tank 31 through from the column top through the tube 29 and the column top gas cooling heat exchanger 30. A liquid inside the liquid tank 31 is taken out as a recovered liquid through the pump 32 and the tube 33. Part of the liquid received in the liquid tank 31 is returned to the column top gas cooling heat exchanger 30 through the tube 34 branches from the tube 33. A gas inside the liquid tank 31 is cooled in the vent gas cooling heat exchanger 35. A condensate is returned to the liquid tank 31 and an uncondensed gas is taken out through the tube 36.

In the decomposition reaction apparatus for acrylic acid or acrylate shown in FIG. 6, a decomposition reaction temperature is preferably 110 to 250° C., particularly preferably 120 to 230° C. A decomposition reaction time is preferably 0.5 to 50 hours (10 to 50 hours for a low decomposition temperature, and 0.5 to 10 hours for a high decomposition temperature). A pressure may be reduced pressure or normal pressure.

As shown in FIGS. 5 and 6, a pump may be provided upstream of the reboiler 5 in the circulation passage. Vacuum equipment is generally not provided in the decomposition reaction apparatus, but may be provided downstream of the vent gas cooling heat exchanger 35 depending on the conditions such as the type or composition of the high boiling point substance, similar to the distillation apparatus.

The tubes 2 and 11 constituting the draw line in FIGS. 5 and 6 are connected by connecting flanges 2a and 11a as shown in FIG. 1. The tubes 3, 4, and 6 and the nozzle 7 constituting the circulation passage in FIGS. 5 and 6 are connected by connecting flanges 3a and 4a and connecting flanges 6a and 7a as shown in FIG. 1.

As shown in FIG. 1, the column body 1 is provided with: a side wall; a supply port 1a opened to the side wall, for supplying the column bottom liquid to the column body 1 from the nozzle 7; a top plate 12a, which is provided so as to extend from the side wall above the supply port 1a, for preventing upward scattering of the column bottom liquid from the supply port 1a; and an impingement plate 12b, which is provided away from the supply port 12a, for preventing scattering of the column bottom liquid from the supply port 1a to a supply direction (direction from the side wall to the center of the column body 1).

The top plate 12a is composed of a plate member having a uniform thickness. As shown in FIG. 1, the top plate 12a is provided to be inclined downward from a base end to a tip end thereof such that an angle (inclination) between an extension direction of the top plate 12a and the side wall is 91° or more. The inclination is preferably 91 to 135°, more preferably 95 to 135°. The top plate 12a is a plate member having a uniform thickness, and thus an angle between a top face of the top plate 12a and the side wall is equal to the inclination. A hole may be provided on the top plate 12a for accelerating falling of a liquid accumulated on the top face of the top plate 12a. However, the hole need not be provided.

The impingement plate 12b is also composed of a plate member having a uniform thickness. As shown in FIG. 1, the impingement plate 12b is provided vertically to the top plate 12a downward from a tip end edge of the top plate 12a. A length of downward extension of the impingement plate 12b is not particularly limited. However, the impingement plate 12b is preferably extended downward to a lower end edge of the supply port 1a or more, and the length of the impingement plate is more preferably equal to or more than a diameter of the supply port 1a. The impingement plate 12b may be provided parallel to the side wall, or provided with an appropriate angle to the side wall such that a distance between the side wall and the impingement plate 12b gradually increases downward, for example.

Figure 2:
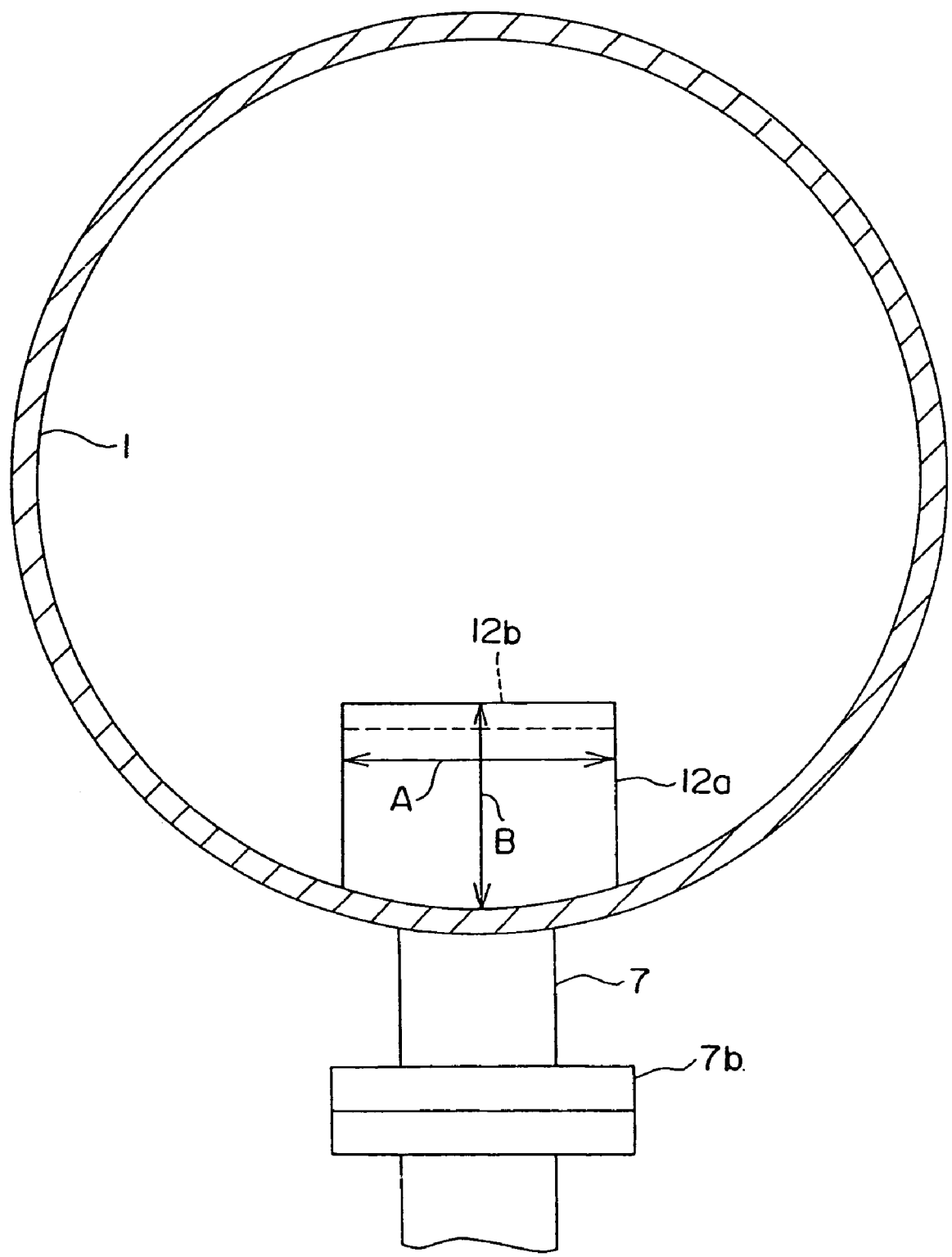
FIG. 2 is a horizontal sectional view of the lower part of the column body 1 shown in FIG. 1.

As shown in FIG. 2, a width A of the top plate 12a or the impingement plate 12b is preferably equal to or more than the diameter of the supply port 1a. An extension length B of the top plate 12a is not particularly limited, but is preferably set accordingly such that an opening area of the impingement plate 12b is equal to or more than a sectional area of the supply port 1a.

The opening area used herein is represented by the product of the width (A in FIG. 2) of the impingement plate 12b and the distance between the side wall and the impingement plate 12b. When a thickness of the impingement plate 12b is substantially small compared to the opening area, the opening area may be represented by the product of A and B in FIG. 2.

The column bottom liquid heated in the reboiler 5 is supplied to the column body 1 from the nozzle 7 through the supply port 1a. Upward flow or scattering of the column bottom liquid supplied from the supply port 1a is restricted by the top plate 12a, and flow or scattering in a central direction in the column body 1 of the column bottom liquid is restricted by the impingement plate 12b. The column bottom liquid supplied from the supply port 1a flows downward regardless of the flow rate. Thus, scattering of the column bottom liquid to the side wall of the column body 1 or the inside of the column body 1 containing trays, packing, and the like provided as required can be prevented.

The top plate 12a is provided to be inclined downward from a base end to a tip end of the top plate 12a, and thus the column bottom liquid or a condensate of an easily polymerizable compound such as acrylic acid, acrylate, raw materials of the acrylic acid and acrylate, and by-products in the column body 1 flows down from the top plate 12a even if attached to the top face of the top plate 12a. Thus, accumulation of the condensate on the top face of the top plate 12a is prevented, thereby formation of a polymerized product from the condensate can be prevented.

The column body 1 may comprise: a vertical plate, which is provided vertically and downward on each side of the top plate 12a from a side end edge of the top plate 12a, for preventing scattering of the column bottom liquid in a horizontal direction from the supply port 1a; and a bottom plate below the supply port 1a, for example, in addition to the impingement plate 12b as the case may be. The bottom plate may be provided with inclination or with holes as in the top plate 12a. When a large volume of the column bottom liquid is circulated from the reboiler, the volume of the column bottom liquid supplied is large and accumulation of the column bottom liquid does not occur on the top face of the bottom plate. In such a case, the bottom plate may be horizontal or need not be provided with holes. The top plate 12a may be provided along the side wall of the column body 1, and a provided length of the top plate 12a is not particularly limited.

FIGS. 5 and 6 each employ the column body 1, the draw line, and the circulation passage shown in FIG. 1, but may employ the column body 1, the draw line, and the circulation passage shown in each of FIGS. 3 and 4.

The structure of the column body 1 and peripheral parts shown in FIG. 3 is the same as the structure of the column body 1 and peripheral parts shown in FIG. 1 except that: the introduction nozzle 3 is connected near a bottom part of the column body 1 to directly introduce the column bottom liquid to be circulated from the column body 1; and the draw nozzle 2 does not branch and is connected to the tube 11 alone.

The structure of the column body 1 and peripheral parts shown in FIG. 4 is the same as the structure of the column body 1 and peripheral parts shown in FIG. 1 except that: a pot part 10 swelling downward is provided in a lower end part of the column body 1; the introduction nozzle 3 is connected to the pot part 10 on a side wall of the pot part 10; the column bottom liquid to be circulated is introduced from the pot part 10; and the draw nozzle 2 is connected to a bottom part of the pot part 10, does not branch, and is connected to the tube 11.

In the structures shown in FIGS. 3 and 4, scattering of the column bottom liquid to the inside of the column body 1 and formation of a polymerized product on the top face of the top plate 12a are also prevented as in the structure shown in FIG. 1.

EXAMPLES

Hereinafter, the present invention will be described in detail based on examples and comparative examples, but the present invention is not limited thereto.

Example 1

A decomposition reaction of a high boiling point liquid was carried out using the decomposition reaction apparatus shown in FIG. 6. An installation angle θ (inclination) of the top plate 12a was 95°. The column body 1, which is a decomposition reactor, has a diameter of 1,000 mm and a length of 2,800 mm and was made of Hastelloy C. The high boiling point liquid has a composition consisting of: 21.0 wt % butyl acrylate; 65.0 wt % β-butyl butoxypropionate; 4.0 wt % butyl acryloxypropionate; 2.0 wt % β-butyl hydroxypropionate; 3.0 wt % hydroquinone; 2.0 wt % methoxyquinone; and 3.0 wt % other compounds. The high boiling point liquid was supplied to the column body 1 at 580 kg/h.

10 wt % of a 1 wt % aqueous solution of sulfuric acid with respect to the high boiling point liquid supplied to the column body 1 was supplied as a decomposition reaction catalyst. A decomposition reaction was carried out at a pressure of 100 kPa, a decomposition temperature of 197° C., and a residence time of 50 minutes. As a result, a reaction residue was obtained at 200.1 kg/h and drawn from a column bottom. The reaction residue had a composition consisting of: 8.7 wt % butyl acrylate; 62.5 wt % β-butyl butoxypropionate; 2.0 wt % butyl acryloxypropionate; 0.3 wt % butyl β-hydroxypropionate; 8.7 wt % hydroquinone; 5.8 wt % methoxyquinone; 0.8 wt % butanol; 2.9 wt % sulfuric acid; and 8.3 wt % other compounds.

The reboiler 5 is a vertical fixed tube plate type heat exchanger. A supply of the column bottom liquid to the reboiler 5 was measured with a flowmeter provided at an outlet of the pump 40, and an initial flow rate was 32,000 kg/h. The column bottom liquid flowed through tubes of the reboiler 5.

After a continuous operation for 3 months, the operation was stopped, and the reboiler 5, the inside of the column body 1, the top plate 12a, and the impingement plate 12b were inspected. The result of the inspection confirmed: no accumulated substances; a stable supply of the liquid to the reboiler 5 during the operation; and no clogging during the operation.

Example 2

The same operation was repeated as that in Example 1 except that the installation angle θ (inclination) of the top plate 12a was changed to 100°. After a continuous operation for 3 months, the operation was stopped, and the reboiler 5 and the like were inspected. The result of the inspection confirmed: no accumulated substances; and no clogging during the operation.

Comparative Example 1

The same operation was repeated as that in Example 2 except that the installation angle θ (inclination) of the top plate 12a was changed to 90°. After a continuous operation for 3 months, a reaction temperature could not be maintained gradually. The operation of the decomposition reaction apparatus was stopped, and the inside of the apparatus was inspected. The result of the inspection confirmed: a viscous polymerized product on the top face of the top plate 12a; and a polymerized product inside the tubes of the reboiler 5.

Example 3

A decomposition reaction of a high boiling point liquid was carried out using the same apparatus as that in Example 1. The high boiling point liquid has a composition consisting of: 45.3 wt % acrylic acid; 10.0 wt % maleic acid; 42.4 wt % acrylic acid dimer (acryloxypropionic acid); 1.3 wt % hydroquinone; and 1.0 wt % phenothiazine. The high boiling point liquid was supplied to the column body 1 at 580 kg/h.

A decomposition reaction was carried out at a pressure of 72 kPa, a decomposition temperature of 188° C., and a residence time of 70 minutes. As a result, a reaction residue was obtained at 130.5 kg/h from the column bottom. The reaction residue had a composition consisting of: 8.0 wt % acrylic acid; 14.0 wt % maleic acid; 67.2 wt % acrylic acid dimer (acryloxypropionic acid); 5.8 wt % hydroquinone; 4.4 wt % phenothiazine; and 0.6 wt % oligomer and polymer.

After a continuous operation for 3 months, the operation was stopped, and the reboiler 5 and the like were inspected. The result of the inspection confirmed: no accumulated substances; stable a supply of the column bottom liquid to the reboiler 5 during the operation; and no clogging during the operation.

Comparative Example 2

The same operation was repeated as that in Example 2 except that the installation angle θ (inclination) of the top plate 12a was changed to 90°. After a continuous operation for 1 month, a temperature of the column bottom liquid could not be maintained. The operation of the decomposition reaction apparatus was stopped immediately, and the inside of the apparatus was inspected. The result of the inspection confirmed: a popcorn-like polymerized product on the top face of the top plate 12a; and partial clogging in the tubes of the reboiler 5.

Example 4

Distillation of crude acrylic acid was carried out in the distillation apparatus shown in FIG. 5 using the distillation column of stainless steel SUS 316 having an inner diameter of 1,100 mm, a length of 20,000 mm, and 21 perforated plates (dual flow trays) provided thereinside as the column body 1. The installation angle θ (inclination) of the top plate 12a is 100°. A pump was provided in the middle of the tube 4. The tube 4 has the same diameter as that of the introduction nozzle 3. A crude acrylic monomer was a mixture consisting of 99.2 wt % acrylic acid, 0.3 wt % maleic acid, 0.3 t % acrylic acid dimer, 0.1 wt % hydroquinone, and 0.1 wt % phenothiazine, and the mixture was supplied to the column body 1 at 90° C. and 1,300 kg/h.

A liquid prepared by dissolving 8 wt % methoquinone in acrylic acid was supplied to the reflux tank 21 at 6.2 kg/h from a not-shown polymerization inhibitor-containing liquid tank. A liquid prepared by dissolving 1 wt % phenothiazine in acrylic acid was supplied to the column body 1 at 31 kg/h. An operation was carried out at a column top pressure of 2.8 kPa, a column bottom pressure of 7.9 kPa, a column top temperature of 53° C., and a column bottom temperature of 75° C., to thereby obtain high purity acrylic acid having a purity of 99.8 wt % or more from the column top.

The reboiler 5 was a vertical fixed tube plate type heat exchanger. A supply of the column bottom liquid to the reboiler 5 was measured with a flowmeter provided by at an outlet of the tube 4, and an initial flow rate was 68,000 kg/h. The column bottom liquid flowed through tubes of the reboiler 5.

After a continuous operation for 6 months, the operation was stopped, and the reboiler 5 was inspected. The result of the inspection confirmed: no accumulated substances; a stable supply of the column bottom liquid to the reboiler 5 during the operation; and no clogging during the operation.

Comparative Example 3

The same operation was repeated as that in Example 4 except that the installation angle θ (inclination) of the top plate 12*a* was changed to 90°. After a continuous operation for 4 months, a temperature of the column bottom liquid could not be maintained and a steam could not be supplied to the reboiler 5. The operation of the decomposition reaction apparatus was stopped, and the inside of the apparatus was inspected. The result of the inspection confirmed: a popcorn-like polymerized product on the top face of the top plate 12*a*; and partial clogging in the tubes of the reboiler 5.

INDUSTRIAL APPLICABILITY

According to the present invention, a simple structure including a top plate having an inclined top face suppresses formation of a polymerized product on the top face of the top plate caused by a liquid containing an easily polymerizable compound. Thus, problems such as clogging by the polymerized product do not occur, and the present invention can provide a vessel for an easily polymerizable compound capable of a stable continuous operation over a long period of time in handling of the easily polymerizable compound such as production and purification of the easily polymerizable compound.

When the present invention is applied to column equipment involving heating a column bottom liquid which is a liquid containing an easily polymerizable compound in a reboiler and circulating the column bottom liquid such as a distillation column, an evaporation column, or a decomposition reaction column, clogging of the reboiler by the polymerized product is prevented. Thus, the column equipment can be stably and continuously operated over a long period of time.

In particular, the present invention is more effective when applied to production or purification of (meth)acrylic acid (acrylic acid or methacrylic acid) and esters thereof.

The invention claimed is:

1. A vessel for an easily polymerizable compound, receiving a liquid containing an easily polyrnerizable compound, comprising:
    a receiving part, which has a side wall and a supply port opened to the side wall for supplying the liquid, for receiving the liquid supplied from the supply port;
    a top plate, which is provided so as to extend from the side wall above the supply port, for preventing upward scattering of the liquid from the supply port;
    an impingement plate, which is provided away from the supply port, for preventing scattering of the liquid from the supply port to a supply direction;
    a liquid circulation passage for drawing the liquid received in the receiving part and for returning the liquid to the receiving part through the supply port; and
    a reboiler for heating the liquid in the liquid circulation passage; wherein
    a top face of the top plate is inclined downward from a base end to a tip end of the top plate, when a side wall end of the top plate is defined as the base end and an extended end of the top plate is defined as the tip end, and an angle between the top face of the top plate and the side wall is in a range of 91 to 135°.

2. The vessel for an easily polymerizable compound according to claim 1, wherein the receiving part is one selected from the group consisting of a distillation column, an evaporation column, and a decomposition reaction column for a high boiling point substance.

3. The vessel for an easily polymerizable compound according to claim 1, wherein the easily polymerizable compound is at least one selected from the group consisting of (meth)acrylic acid and (meth)acrylate.

4. The vessel for an easily polymerizable compound according to claim 1, wherein the angle between the top face of the top plate and the side wall is in a range of 95 to 135°.

5. A method for distilling an easily polymerizable compound, selected from the group consisting of (meth)acrylic acid and (meth)acrylate, using a distillation column, comprising:
    drawing the easily polymerizable compound in the distillation column from the bottom of the distillation column to a liquid circulation passage;
    heating a part or all of the easily polymerizable compound drawn into the liquid circulation passage by a reboiler; and
    returning the heated easily polymerizable compound to the distillation column; wherein the receiving part of the vessel according to claim 1 is used as the distillation column.

6. A method for decomposing a high boiling point liquid, produced with a production of an easily polymerizable compound selected from the group consisting of (meth)acrylic acid and (meth)acrylate, in a decomposition reaction column to recover valuable substances, comprising:
    drawing the high boiling point liquid in the decomposition reaction column from the bottom of the decomposition reaction column to a liquid circulation passage;

heating a part or all of the high boiling point liquid drawn into the liquid circulation passage by a reboiler; and returning the heated high boiling point liquid to the decomposition reaction column; wherein the receiving part of the vessel according to claim 1 is used as the decomposition reaction column.

7. The method according to claim 6, wherein the high boiling point liquid is a column bottom liquid obtained in purification by distillation of the easily polymerizable compound using the distillation column.

* * * * *